(12) United States Patent
Nyssen

(10) Patent No.: US 6,818,050 B1
(45) Date of Patent: Nov. 16, 2004

(54) LACQUERS AND PAINTS AND COATING MATERIAL SYSTEMS

(75) Inventor: Peter-Roger Nyssen, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 82 days.

(21) Appl. No.: 09/938,000

(22) PCT Filed: Sep. 27, 2001

(86) PCT No.: PCT/EP00/02386

§ 371 (c)(1),
(2), (4) Date: Sep. 27, 2001

(87) PCT Pub. No.: WO00/60015

PCT Pub. Date: Oct. 12, 2000

(30) Foreign Application Priority Data

Mar. 30, 1999 (DE) .......................... 199 14 329

(51) Int. Cl.⁷ .............................. C09D 5/14; C09D 7/14
(52) U.S. Cl. ...................... 106/401; 106/402; 106/412; 106/414; 106/420; 106/421; 106/425; 106/432; 106/436; 106/450; 106/452; 106/453; 106/456; 106/472; 106/480; 106/493; 106/494; 106/495; 106/496; 106/497; 106/498; 106/499; 106/500; 106/502; 106/504; 524/81; 524/401
(58) Field of Search ................... 106/401, 402, 106/412, 414, 420, 421, 425, 432, 436, 450, 452, 453, 456, 472, 480, 493, 494, 495, 496, 497, 498, 499, 500, 502, 504, 712; 524/81, 401

(56) References Cited

U.S. PATENT DOCUMENTS

| | | | | |
|---|---|---|---|---|
| 4,243,565 A | * | 1/1981 | Nishino et al. | 523/409 |
| 4,430,367 A | * | 2/1984 | Lat | 427/388.4 |
| 4,622,117 A | * | 11/1986 | Geist et al. | 428/418 |
| 5,221,334 A | | 6/1993 | Ma et al. | 106/20 D |
| 5,519,085 A | | 5/1996 | Ma et al. | 524/503 |
| 5,814,685 A | * | 9/1998 | Satake et al. | 523/201 |
| 5,855,662 A | | 1/1999 | Brand et al. | 106/498 |
| 6,267,812 B1 | * | 7/2001 | Lefer et al. | 106/487 |
| 6,451,901 B1 | * | 9/2002 | Maekawa et al. | 524/505 |
| 6,478,866 B1 | * | 11/2002 | Nyssen et al. | 106/503 |

FOREIGN PATENT DOCUMENTS

| | | |
|---|---|---|
| DE | 1 963 382 | 6/1971 |
| DE | 19652813 | 6/1998 |
| JP | 04174795 A * | 6/1992 |

OTHER PUBLICATIONS

ROMPP Lexikon, Lacke und Druckfarben, (month unavailable) 1998, Dr. Ulrich Zorll.
Feinmahl–und Klassiertechnik, Preprints, Conference Dec. 1993, GVC. VDI–Gesellschaft Verfahrenstechnik und Chemieingenieurwesen, Ruhrwerkmuhlen, Prof. Dr.–Ing. J. Schwedes (month unavailable).
Farbe&Lack 104. Jahrgang. 7/98, Auf einen Nenner gebracht, Verbesserung der anwendungstechnischen Eigenschaften von Dispersionsfarben durch Kombinationen aus Polyurethane–Verdickungsmitteln und Celluloseethern, Jorg Muller, Uwe Thies, Monheim, Hermann Kober und Jan Mazanek, Leverkusen. pp. 30–40.
**Chemical Abstracts, vol. 105, No. 10, Sep. 10, 1986 Columbus, Ohio, US; abstract No. 80718q, Stoffer James: "ultrasonic dispersion of pigment in water–based paints" Seite 98; Spalte rechte; XP002143046 Zusammenfassung & Proc. Water–Borne Higher–Solids coat. Symp., Bd. 13, 1986, Seiten 410–431.
Pigment + Fullstoff, 5 edition (month unavailable) 1994, O. Luckert.
Handbuch der, Pigmentverarbeitung, Physikalisch–chemische Grundlagen, (month unavailable) 1998, pp. 194–266, Dispergierprozeβ: Ermittlung des Dispergiergrades und mathematische Modelle, Juan M. Oyarzun.

* cited by examiner

*Primary Examiner*—Anthony J. Green
(74) *Attorney, Agent, or Firm*—Diderico van Eyl; Jill Denesvich; Godfried R. Akorli

(57) ABSTRACT

Paint and coating material system comprising
  a) at least one solids component comprising at least one organic or inorganic white, black or chromatic pigment, organic or inorganic fillers, or mixtures thereof, and
  b) at least one binder component,
characterized in that the components of the system in water, with a specific energy input of less than 150 J/cm³, based on the sum of the volumes of the components and water, produced an aqueous dispersion having a particle size of <60 μm (determined in accordance with ISO 1524: 1983).

10 Claims, No Drawings

LACQUERS AND PAINTS AND COATING MATERIAL SYSTEMS

BACKGROUND OF THE INVENTION

The invention relates to paint and coating material systems and to their use for preparing paint and coating materials.

In the field of pigmented liquid paint and coating materials, the use of aqueous or solvent dispersions of pigments and fillers, and binders, in particular, is known. Examples of suitable pigments and fillers include organic and inorganic colour pigments, i.e. white, black and chromatic pigments. Binders used include both organic and inorganic, but generally organic, network-forming or film-forming polymers which may be present in emulsified, dispersed or dissolved state in a paint material.

Pigmented paint and coating materials generally include further additives and, possibly, further solvents.

The pigmented aqueous paint and coating materials are generally prepared by dispersing the pigments and fillers in the presence of water and, where appropriate, further additions. Dispersion comprises the deaggregation or deagglomeration of the pigment and filler particles, which in their dry powder form or aqueous presscake form are in a state of high physical aggregation on account of their preparation process, and also the physical stabilization of the pigments or fillers finely distributed in this way, by means of suitable additives such as dispersants, emulsifiers or thickeners, for example, in order to achieve the desired properties of the finished liquid products (paints), such as storage stability, hiding power and whiteness (lightening), colour strength, shade and brilliance, etc. Consequently, the preparation of the aqueous paints and coating materials always involves the high energy input which, industrially, can be effected only through the use of, for example, wet comminuting machines such as dissolvers, attritors, ball mills, rotor-stator mills, stirred bead mills, high-pressure homogenises and so on.

For this reason, the dispersions can be prepared only on the industrial scale; and it is only on that scale that industrial equipment is available on the market and can be used economically. In the past, until the present day, a consequence of this has been that paint and coating materials have been obtainable exclusively as ready-formulated liquid preparations. This applies both to products intended for industrial use and to those intended for use closer to the consumer.

As well as the advantages of the ease of handling of the liquid preparations matched in this way to the use in question, however, there are considerable disadvantages. For instance, the relatively large volume of the paint and coating materials owing to the water and possibly solvents they contain (in total up to 90%; e.g. high-grade white interior paint: from 30 to 50% by volume water) is disadvantageous since it entails great expenditure as regards the nature and size of the means of packaging (tin cans, plastic buckets and drums) and as regards the storage and transport.

Moreover, the aqueous preparations often possess inadequate keeping properties and storage properties owing to:
Mould and bacterial infestation, necessitating the use of high quantities of biocide;
Sedimentation or reagglomeration of the pigments or fillers or thickening of the liquid phase, generally necessitating stirring of the products before use;
Drying (including drying-out) of the products in and to the container, always associated with noticeable quality detractions in the products, such as bittyness in the paint or in the coating, for example.

Often, a large amount of agents for improving the anti-freeze qualities and resistance to drying out, such as solvents, especially glycols, polyglycols and so on, is necessary; however, such agents bring with them grave disadvantages as regards the very properties of the product, such as the microbiological keeping properties and the tackiness of the products following application, for example. Furthermore, it is nowadays becoming more and more difficult to find suitable preservatives for aqueous preparations containing, for example, glycol or polyglycol that are able to counter the increasing adaptation of microorganisms and are also environmentally acceptable.

Grave environmental disadvantages of liquid preparations relate in particular to the disposal of leftover products, product wastes and containers at all stages of the product life cycle. This applies to the production process of the aqueous preparations, storage and container filling, selling, storage and use in households and industry, and in the trade. As far as aqueous paint materials are concerned, for instance, it is easy to estimate that in private households alone the amount of leftover products and product wastes is very large. Disposing of such leftovers and wastes is known to be expensive. It is therefore an object of the present invention to provide a paint and coating material system with which the above disadvantages can be largely avoided.

SUMMARY OF THE INVENTION

A paint and coating material system has now been found comprising
a) at least one solids component comprising at least one organic or inorganic white, black or chromatic pigment, organic or inorganic fillers, or mixtures thereof, and
b) at least one binder component, characterized in that the components of the system in water, with a specific energy input of less than 150 J/cm$^3$, based on the sum of the volumes of the components and water, produce an aqueous dispersion having a particle size of <60 μm, preferably less than 40 μm (determined in accordance with ISO 1524: 1983).

DETAILED DESCRIPTION OF THE INVENTION

The specific energy input $E_v$ may be described by the following formula:

$$E_v = N*t/V_s$$

where
N[W]: is the power provided by the stirrer, especially electrical power
t[s]: is the dispersing lime or duration of energy input
$V_s$[cm$^3$]: is the total volume of the sum of all components
The lower the numerical value $E_v$[J/cm$^3$] for achieving the desired properties of the paint and coating materials, such as hiding power, colour strength, etc., the easier the solids of component a) are to disperse in the system.

The system of the invention is characterized in particular in that, in comparison to the prior art in the preparation of paint and coating materials, the specific energy input required to disperse the pigments and fillers present in the solids component a) in water completely is substantially lower. (Prior art literature: e.g. Juan m. Oyarzún, Pigmentverarbeitung, Handbuch der physikalisch-chemischen Grundlagen, Verlag Vincentz, 1998.)

Solids Component a)

The solids component a) is not restrictive in its form; however, powders, granules, flakes or pellets are particularly suitable.

Suitable pigments and fillers include those known from the prior art, as may be derived, for example, from Lückert, Pigment+Füllstoff Tabellen, 5th edition, Laatzen, 1994.

As inorganic white pigments, mention should be made in particular of oxides, such as titanium dioxide, zinc oxide (ZnO, zinc white), zirconium oxide, carbonates such as lead white, sulphates, such as lead stulphate, and sulphides such as zinc sulphide, and lithopones; titanium dioxide is particularly preferred.

As inorganic chromatic pigments, mention should be made of those from the group of oxides and hydroxides in the form of their individual inorganic compounds or mixed phases, especially iron oxide pigments, chromium oxide pigments and oxidic mixed-phase pigments with rutile or spinel structure, and also bismuth vanadate, cadmium, cerium sulphide, chromate, ultramarine and iron blue pigments.

Examples of iron oxide pigments are Colour Index Pigment Yellow 42, Pigment Red 101, Pigment Blue 11, Pigment Brown 6, and transparent iron oxide pigments. Examples of chromium oxide pigments are Colour Index Pigment Green 17 and Pigment Green 18.

Examples of oxidic mixed-phase pigments are nickel titanium yellow and chromium titanium yellow, cobalt green and cobalt blue, zinc iron brown and chromium iron brown, and also iron manganese black and spinel black.

Examples of preferred organic pigments are those of the monoazo, disazo, laked azo, β-naphthol, Naphiol AS, benzimidazolone, disazo condensation, azo metal complex, isoindoline and isoindolinone series, and also polycyclic pigments such as those from the phthalocyanine, quinacridone, perylene, perinone, thioindigo, anthraquinone, dioxazine, quinophthalone and diketopyrrolopyrrole series. Also suitable are laked dyes such as Ca, Mg and Al lakes of dyes containing sulphonic acid or carboxylic acid groups, and also carbon blacks, which for the purposes of this specification are taken to be pigments and of which a large number are known, for example, from Colour Index, 2nd edition. Mention should be made in particular of acidic to alkaline carbon blacks obtained by the furnace black process, and also chemically surface-modified carbon blacks, examples being sulpho- or carboxyl-containing carbon blacks.

Examples of inorganic black pigments that should be mentioned include those as already described above together with the inorganic chromatic pigments, especially black iron oxide, spinel black, and black oxidic mixed-phase pigments.

Fillers particularly comprise substances other than the pigments mentioned, these substances being primarily light in colour and being inert towards the binder of component b). With particular preference, the fillers have a lower optical refractive index than the aforementioned white pigments.

Examples of inorganic fillers that may be mentioned include carbonates, such as chalk, calcite or dolomite, for example, silicon dioxide (ground quartz), natural or synthetic silicas, silicates, such as talc, kaolin or mica, for example, and sulphates such as heavy spar or barium sulphate (blanc fixe), for example.

Examples of organic fillers include polymeric powders and those known as hollow spheres.

The solids component a) may further comprise other pigments, especially lustre pigments such as pearlescent, metallic or interference pigments and also "functional pigments", especially anti-corrosion pigments such as lead, chromate or phosphate anti-corrosion pigments or metallic anti-corrosion pigments, and conductive pigments such as conductive carbon blacks, for example, or Sb-doped $SnO_2$-coated mica pigments.

As additives, the solids component a) may optionally comprise surface-active agents, thickeners, thixotropic agents, defoamers and, for example, foam preventatives and water-softening auxiliaries. In accordance with the invention, there is no need to impose any restriction regarding the selection of suitable compounds for the surface-active agents. They are used preferably for physical stabilization of the finely divided pigment and filler particles during the preparation of the solids component a) and/or in the finished paint and coating materials themselves. Surface-active agents used are preferably dispersants, wetting agents and emulsifiers as widely used in the commercially customary paint and coating materials. In particular, they may be nonionic, ionic, cationic or amphoteric, and monomeric or polymeric, in nature.

Preferred dispersants include those of component a1) to a5):

a1) Oxalkylation products obtainable by condensing phenolic OH-containing aromatics with formaldehyde and NH-functional groups.

a2) Water-soluble polyisocyanate adducts containing hydrophilic polyether chains and preferably having a maximum isocyanate group content of 1.0% by weight, containing 30–99.5% by weight of ethylene oxide units arranged within polyether chains and incorporated by way of monofunctional alcohols, and having an ionic group content of 0–200 milliequivalelent/100 g polyisocyanate adduct;

Dispersants of this kind are disclosed, for example, in DE-A 1 963 382.

a3) Water-soluble inorganic salts, especially borates, carbonates, silicates, sulphates, sulphites, selenates, chlorides, fluorides, phosphates, nitrates and aluminates of the alkali metals and alkaline earth metals and of other metals, and also ammonium;

Compounds from the group of the water-soluble salts are used preferably in compositions based on inorganic pigments or fillers (comp. a). This group includes sulphates, chlorides, fluorides, nitrates, carbonates, silicates, phosphates, sulphites, selenates, aluminates and borates of the alkali metals and alkaline earth metals and of other metals (e.g. aluminium and iron) and also of ammonium.

Magnesium sulphate is particularly preferred.

a4) Polymers composed of repeating succinyl units, especially polyaspartic acid.

Moreover, dispersants used may include those from group a5). These are nonionic, anionic, cationic or amphoteric compounds.

Examples of nonionic dispersants of component a5) include the following: alkoxylates, alkylolamides, esters, amine oxides and alkyl polyglycosides.

Suitable nonionic dispersants of component a5) also include the following: reaction products of alkylene oxides with alkylatable compounds, such as fatty alcohols, fatty amines, fatty acids, phenols, alkylphenols, carboxamides and resin acids. These products comprise, for example, ethylene oxide adducts from the class of the reaction products of ethylene oxide with:

a) saturated and/or unsaturated fatty alcohols having from 6 to 20 carbon atoms or b) alkylphenols having from 4 to 12 carbon atoms in the alkyl radical or c) saturated and/or unsaturated fatty amines having from 14 to 20 carbon atoms or d) saturated and/or unsaturated fatty acids having from 14 to 20 carbon atoms or e) hydrogenated and/or unhydrogenated resin acids, f) esterification and/or arylation products which have been prepared from natural or modified, optionally hydrogenated castor oil fatty substances and which if desired have been linked to form repeating structural units by esterification with dicarboxylic acids.

Nonionic polymeric dispersants are particularly preferred.

Examples of suitable polymeric dispersants include water-soluble and also water-emulsifiable compounds, e.g. homopolymers and copolymers, graft polymers and graft copolymers, and random block copolymers.

Particularly preferred polymeric dispersants are, for example, AB, BAB and ABC block copolymers. In the AB or BAB block copolymers, the A segment is a hydrophobic homopolymer or copolymer which secures a bond to the pigment and the B block is a hydrophilic homopolymer or copolymer or a salt thereof and ensures the dispersing of the pigment in the aqueous medium. Polymeric dispersants of this kind and their synthesis are disclosed, for example, in EP-A-518 225 and EP-A-556 649.

Further examples of suitable polymeric dispersants are polyethylene oxides, polypropylene oxides, polyoxymethylenes, polytrimethylene oxides, polyvinyl methyl ethers, polyethyleneimines, polyacrylic acids, polyacrylamides, polymethacrylic acids, polymethacrylamides, poly-N,N-dimethylacrylamides, poly-N-isopropyl-acrylamides, poly-N-acryloylglycinamides, poly-N-methacryloylglycinamides, polyvinyloxazolidones and polyvinylmethyloxazolidones.

Examples of anionic dispersants are alkyl sulphates, ether sulphates, ether carboxylates, phosphate esters, sulphosuccinate amides, paraffinsulphonates, olefinsulphonates, sarcosinates, isethionates and taurates.

Anionic polymeric dispersants are particularly preferred.

Further suitable products include condensation products obtainable by reacting naphthols with alkanols, adding on alkylene oxide and at least partly converting the terminal hydroxyl groups into sulpho groups, or monoesters of maleic acid, phthalic acid or succinic acid.

Also suitable are dispersants from the group of the sulphosuccinic esters and also alkylbenzenesulphonates. Tonically modified, alkoxylated fatty acid alcohols or their salts as well. By alkoxylated fatty acid alcohols are meant in particular those $C_6$–$C_{22}$ fatly acid alcohols containing from 5 to 120, preferably from 5 to 60, in particular from 5 to 30 ethylene oxide units and being saturated or unsaturated, especially stearyl alcohol. Particular preference is given to a stearyl alcohol alkoxylated with from 8 to 10 ethylene oxide units. The ionically modified alkoxylated fatty acid alcohols are preferably in salt form, in particular as alkali metal or amine salts, preferably as the diethylamine salt. By ionic modification is meant, for example, sulphation, carboxylation or phosphation.

Further examples of anionic polymeric dispersants are the salts of polyacrylic acids, polyethylenesulphonic acids, polystyrenesulphonic acids, polymethacrylic acids and polyphosphoric acids.

Additional examples of anionic polymeric dispersants are copolymers of acrylic monomers, which are indicated by way of example in the table below by combination of the following monomers, which are synthesised into random, alternating or graft copolymers:

| | |
|---|---|
| acrylamide, | acrylic acid; |
| acrylamide, | acrylonitrile; |
| acrylic acid, | N-acryloylglycinamide; |
| acrylic acid, | ethyl acrylate; |
| acrylic acid, | methyl acrylate; |
| acrylic acid, | methylenebutyrolactam; |
| N-acryloylglycinamide, | N-isopropylacrylamide; |
| methacrylamide, | methacrylic acid; |
| methacrylic acid, | benzyl methacrylate; |
| methacrylic acid, | diphenylmethyl methacrylate; |
| methacrylic acid, | methyl methacrylate; |
| methacrylic acid, | styrene. |

Further anionic polymeric dispersants are styrene-maleic anhydride copolymers, copolymers thereof with the above-mentioned acrylic monomers, and also polyurethane-based polymers.

Also suitable are lignin-type compounds, especially ligninsulphonates, e.g. those obtained by the sulphite or kraft process. The products in question are preferably partly hydrolysed, oxidized, propoxylated, sulphonated, sulphomethylated or disulphonated and fractionated by known processes, for example by molecular weight or by degree of sulphonation. Mixtures of sulphite and kraft ligninsulphonates are also highly effective. Particularly suitable ligninsulphonates are those having an average molecular weight of more than 1000 to 100,000, an active ligninsulphonate content of at least 80% and preferably a low polyvalent cation content. The degree of sulphonation may vary within wide limits.

Examples of cationic dispersants include the following: quaternary alkylammonium compounds and imidazoles.

Cationic polymeric dispersants are particularly preferred.

Examples of cationic polymeric dispersants are the salts of polyethyleneimines, polyvinylamines, poly(2-vinylpyridines), poly(4-vinylpyridines), poly(diallyl-dimethylammonium) chloride, poly(4-vinylbenzyltrimethylammonium) salts, poly(2-vinylpiperidine).

Examples of amphoteric dispersants include the following: betaines, glycinates, propionates and imidazolines.

Anionic and cationic polymers are summarized as polyelectrolytes and are partly or fully dissociable in an aqueous and/or organic phase.

Particularly suitable thickeners include organic, natural, semisynthetic or synthetic thickeners.

They may be used to adjust the viscosity of the paints and coating materials and for stabilization and viscosity adjustment during the preparation process of the solids component a). An overview of the appropriate thickeners may be found, for example, in Römpp Lexikon Lacke und Druckfarben, Ulrich Zorll, Thieme Verlag, Stuttgart, 1998. As suitable thickeners, mentioned may be made of those from the group of the anionic or nonionic organic water-soluble polymers, which in the wider sense may also be used as protective colloids for the finely divided pigment particles in the solids component a). They serve the purpose both of countering reaggregation during the preparation of the said particles (especially during drying) and of improving redispersability and compatibility in the various binder components b) together with water. Particular preference is given to organic thickeners which are preferably completely soluble or dispersible in water.

As the organic thickener it is preferred to use a compound whose 4% strength aqueous solution at 20° C. has a viscosity of $\geq 2$ mPa.s.

Preferred organic thickeners are compounds selected from the following groups:

dextrins or cyclodextrins, starch and starch derivatives, especially degraded or partially degraded starch, anionic polyhydroxy compounds, especially xanthan or carboxymethylcellulose, cellulose derivatives such as inethylcellulose and hydroxyalkylcellulose, especially hydroxymethyl-, hydroxyethyl- or hydroxypropylcellulose, polyacrylates, polyetherpolyols or polyurethane derivatives, partially hydrolysed polymers of vinyl acetate, preferably polyvinyl alcohol, which are hydrolysed to the extent of more than 70%, and/or vinyl alcohol copolymers, preferably copolymers of vinyl acetate and alkylvinyl ester, which are partly or fully saponified, and also polyvinyl alcohol itself, polymers of N-vinylpyrrolidone, or copolymers with vinyl esters.

Preferred thickeners include starch, derivatized starch and, in particular, degraded starch.

Degraded starch is obtained, for example, by subjecting, for example, natural potato, wheat, maize, rice or tapioca starch to oxidative, thermal, enzymatic or hydrolytic degradation. Preference is given here to oxidatively degraded starches, particular preference to potato starch oxidatively degraded using hypochlorite.

Also suitable, in particular, are dextrins and cyclodextrins. Dextrins are preferably white dextrins, yellow dextrins and maltodextrins having a solubility in cold water of more than 50% by weight, preferably more than 90%, measured for 10 g in 200 ml of water at 20° C.

Preferred cyclodextrins are those of the α-CD type with 6 glucopyranose units, the β-CD type with 7 glucopyranose units and the γ-CD type with 8 glucopyranose units, and also branched AD, AC, AD-diclosyl CDs and mixtures of the said dextrins.

Preferred anionic polyhydroxy compounds include polysaccharides especially xanthan, and also carboxymethylcelulose.

As cellulose derivatives it is possible to use preferably methylcellulose, hydroxymethylcellulose, hydroxyethyl- and -propylcellulose.

Particularly suitable thickeners include at least partially hydrolysed (saponified) polymers and copolymers of vinyl acetate which are fully dispersible, preferably fully soluble, in water. Preference is given to hydrolysed polymers and copolymers of vinyl acetate with a degree of hydrolysis of from 70 to 97%, preferably from 80 to 92%, a molecular weight of from 1000 to 150,000, preferably from 2000 to 100,000 gimol, and an efflux viscosity (determined on a 4% strength aqueous solution at 20° C.) of from 2 to 35 mPa.s, preferably from 2 to 10 mPa.s.

Particular preference is given to partially hydrolysed polyvinyl alcohols and also to polyvinyl alcohol itself.

By vinyl acetate copolymers are meant, as thickeners, in particular, fully or partially saponified vinyl alcohol copolymers, especially fully saponified copolymers of alkylvinyl ester and vinyl acetate having an alkylvinyl ester content of preferably from 5 to 20 mol%, especially copolymers of alkylvinyl acetate and vinyl acetate.

Further suitable thickeners include homopolymers and copolymers of N-vinylpyrrolidone which disperse fully in water.

Advantageous thickeners are polymers having from 35 to 100 mol% fractions of compounds of the general formula

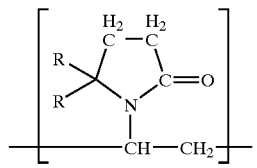

where R and R' are independently of one another H, methyl or ethyl and a 0–65 mol% fraction of one or more monoethylenically unsaturated comonomers, especially vinyl esters such as vinyl acetate, acrylic esters such as ethyl acrylate, methacrylic esters such as methyl methacrylate, vinyl alkyl others such as vinyl cyclohexyl ether, vinyl halides such as vinyl chloride, vinyl alcohol, acrylonitrile, styrene, vinylcarbazole and others.

The molecular weight of the homopolymers and copolymers of N-vinylpyrrolidone is 2000–150,000, preferably less than 100,000 g/mol.

Very particular preference is given to homopolymers of N-vinylpyrrolidone and also copolymers with vinyl esters.

Thixotropic agents are suitable, for example, for adjusting the storage and processing properties, such as film-forming and levelling properties, for example, of the desired paint and coating materials. An overview may be found, for example, in Römpp Lexikon, Lacke und Druckfarben, Ulrich Zorll, Thieme Verlag, Stuttgart, 1998.

Examples of suitable thixotropic agents are phyllosilicates, pyrogenic silicas, and organic compounds based, for example, on high molecular mass polyolefins, hydrogenated castor oil, polyamides, cellulose derivatives or polyacrylates.

Also suitable are low molecular mass, gemicrystalline organic compounds based on urea and also acrylate copolymer microparticles, which form microgels in the desired paint and coating materials.

As regards suitable defoamers and foam preventatives, there are no restrictions. Particularly suitable products include those based on natural oils or mineral oils, optionally chemically modified alcohols and chemically modified silicones. As a consequence of the very low energy input involved in preparing the paint or coaling materials, it is possible in accordance with the invention greatly to reduce the level of defoamers in comparison to liquid preparations, or to avoid them entirely.

Water-softening auxiliaries may be advantageous both when preparing the solids component a) and in the paints and coating materials themselves. Examples of those suitable include medium to high molecular mass polyphosphates (e.g. Calgon®).

Besides the abovementioned additives, the solids component a) may optionally include further customary agents such as pH regulators, further film-forming and levelling assistants, dryers (siccatives), anti-skinning agents, anti-fouling agents, UV protectants and stabilizers, biocides, wood preservatives, etc.

Preferred solids components a) possess a residual moisture content of less than 15% by weight, preferably less than 5% by weight, in particular less than 1% by weight. The solids component a) is preferably in the form of its powder, its cubic, spherical or bead like granules, or in the form of coarse pellets. Particular preference is given to granules having an average particle size, determined from the mass distribution, of from 20 to 5,000 μm, preferably from 50 to 2,000 μm, in particular from 100 to 500 μm.

The total amount of additives in the solids component a), based on the overall solids component a), is generally from 0 to 70% by weight, preferably from 0.2 to 40% by weight, in particular from 0.5 to 20% by weight.

With particular preference the solids component a) contains from 30 to 99.5% by weight, in particular from 40 to 99% by weight, of pigments and fillers.

Binder Component b)

Suitable binders of component b) include both organic and inorganic compounds. In accordance with the invention there is no restriction as regards these compounds. Preferred organic binders are water-soluble, water-dispersible or water-emulsifiable, natural, natural-modified or synthetic, generally film-forming compounds. Synthetic binders are, for example, polymers based on acrylic, vinyl, styrene or isocyanate monomers and also mixtures and copolymers thereof. As natural-modified binders, mention may be made in particular of cellulose derivatives.

Natural binders that may be mentioned include the following:

natural resins, such as rosin or schellac, for example natural oils, especially oils containing fatty acids which are saturated or contain various degrees of unsaturation, said oils being oxidatively drying if desired, such as linseed oil, ricinene oil, soya oil, castor oil, etc.

bitumen, asphalt or pitch.

Naturally modified binders are, in particular, chemically modified natural resins, e.g. rosin-maleate resin, and also modified oils, e.g. thick oils, isomerized oils, styrenized and acrylated oils, cyclo oils, and also maleate oils, urethane oils and factorized oils.

Further natural-modified binders are cellulose derivatives such as cellulose nitrates, cellulose ethers, cellulose esters of organic acids, and also modified natural rubber such as cyclo rubber and chlorinated rubber, for example.

Examples of synthetic binders are saturated polyesters obtained by polyesterifying bifunctional or higher polyfunctional alcohols with polyfunctional saturated-aliphatic, cyclo-aliphatic or aromatic carboxylic acids and/or their anhydrides; both hydroxy-functional and carboxy-functional polyesters are suitable.

Furthermore, mention may be made of unsaturated polyesters, free-radically copolymerized if desired with monomeric (meth)acrylates, allyl compounds, other unsaturated monomers, especially styrene, and also of unsaturated radiation-curing acrylate resins such as polyester, polyether, epoxy and urethane acrylates, for example.

Further synthetic organic binders are alkyd resins (polyesters modified with fatty acids, fatty oils or higher synthetic carboxylic acids) and also chemically modified alkyd resins, examples being styrenised, acrylated, urethanised, silicone-modified, polyamide-modified and resin-modified alkyd resins, and also especially water-dilutible alkyd resins, based for example on neutralizable short-oil and medium-oil, carboxyacidic alkyd resins, self-emulsifiable alkyl resins of reduced acid number, having permanently hydrophilic polyether chains in the molecule, and also alkyd resins which can be emulsified by means of surfactants.

Further suitable organic bindersinclude acrylic resins (polyacrylates) in the form of their homopolymers and copolymers, e.g. styrene acrylate, and also polyacrylic polyols. Water-dilutible acrylic resins are particularly preferred.

Suitable binders of component b) include preferably polymer dispersions, especially emulsion (co)polymers such as styrene-butadiene, vinyl acetate, wall-acrylate, and styrene-acrylate copolymers, for example.

Moreover, the following may be mentioned as organic binders of component b):

phenolic, melaminc, benzoguanamine, urea and carbamic ester resins epoxy resins and epoxide esters one- and two-component polyurethane systems silicone resins Examples of suitable inorganic binders include lime in the form, for example, of calcium hydroxide or lime hydrate (powder), white cement (powder) and also silicate compounds (alkali metal silicates) such as, for example, potash waterglass as an aqueous solution of potassium silicate.

Mixtures of alkali metal silicates with polymer dispersions, e.g. styrene-acrylate copolymers, are also suitable.

The binder component b) may be present in either solid or liquid form. Examples of solid forms are powders, granules or pellets. Examples of suitable liquid forms are aqueous solutions and also aqueous dispersions such as emulsions or suspensions, for example.

In addition to the abovementioned, generally film-forming binders, the binders of component b) may additionally comprise further additives. Suitable additives include, in the widest sense, those specified in connection with the solids component a), but especially those additives which are customary in formulating the desired paint and coating materials. Suitable such additives preferably include thickeners and thixotropic agents (as set out above) and also surface-active agents for achieving aqueous dispersions of the abovementioned binders. The amount of additives in component b) is generally from 0 to 40% by weight, preferably from 0 to 10% by weight, based on the overall binder component b).

As a possibly further component, a solvent component c) may be part of the paint or binder system. Preferred solvents include water-soluble or water-miscible solvents. The solvent may serve either as a cosolvent for the binder component b) or as an auxiliary for improving the drying and film-forming properties of the paint and coating materials. Also suitable are mixtures of different solvents, and, where appropriate, also polymeric, high-boiling solvents having a boiling point of more than 250° C. In accordance with the invention there is no restriction as regards the solvents to be used. Preference, however, is given to those used in the prior art paint and coating materials. These include, in particular, compounds from the group of the aliphatic, cycloaliphatic or aromatic hydrocarbons and terpene hydrocarbons, and also alcohols, glycol ethers and polyglycol ethers, esters and ketones. Amine-type solvents are also suitable, especially those based on primary, secondary and tertiary, aliphatic and also aromatic or cycloaliphatic amines, and also mixtures and derivatives thereof.

The amount of solvent introduced where appropriate in the system of the invention is guided by the desired processing properties and by the use of the paint and coating materials and also by environmental aspects of the application. In general, solvents should be compatible with the coating material and volatile on application under the particular film formation conditions. The abovementioned solvents may also function as diluents or extenders for the paint and coating material. Based on the said system, the solvent content of component c) is preferably less than 55% by weight, in particular less than 30% by weight.

For the paint and coating material system of the invention it is preferred to provide all necessary pigments and fillers in the form of one or more solids components a). It is especially advantageous to provide separate solids components a) for fillers and pigments. Similarly, one solids component a) may also consist of a mixture based on pigments and fillers.

The paint and coating material system of the invention preferably contains from 1 to 95% by weight, in particular from 5 to 70% by weight, of at least one solids component a) and from 0.1 to 60% by weight, in particular from 1 to 30% by weight, of the binder component b) in solid or liquid form, and also from 4.9 to 98.9% by weight, in particular from 10 to 80% by weight, of water and, where appropriate, a water-soluble or water-miscible solvent.

In another preferred embodiment, the paint and coating material systems of the invention contain preferably more than 95% by weight of components a), b) and water, in particular more than 98, preferably more than 99% by weight.

The stirring of the components into water with an energy input of less than 150 $J/cm^3$, in particular less than 130 $J/cm^3$, with particular preference less than 120 $J/cm^3$, is ensured merely by simple stirring corporation by hand or electric manual stirring machine, for example, of components a) and b) into water.

Following mixing of the components in water with a specific energy input of less than 150 $J/cm^3$, the paint and coating system of the invention preferably has a particle size of less than 50 μm, in particular of less than 40 μm.

Preparation of the Solids Component a)

Particular preference is given to using a solids component a) obtainable by subjecting the organic or inorganic pigments or fillers in solid form, preferably as finished or unfinished powders or granules, or as an aqueous suspension, in particular as an aqueous presscake, to wet comminution in an aqueous or aqueous-organic medium, together if appropriate with the abovementioned additives, and to subsequent drying.

In this context it is preferred to use an aqueous medium having a pH of from 2 to 12, in particular from 2 to 10. In general, a temperature of from 0 to 95° C., preferably from 20 to 60° C., is employed for continuous or discontinuous wet comminution. Wet comminution refers in this context to homogenising, grinding and also kneading. This process step converts pigments and/or fillers into a finely divided state. The requisite additives may be added, if desired, before, during or after the state of fine division has been brought about. The selection of the techniques for achieving the desired fine division prior to drying is guided by the state of aggregation or agglomeration of the solids used and by the energy requirement to achieve the desired fine division. Examples of suitable techniques for organic or inorganic fillers and also inorganic pigments include dissolvers, Ultraturrax or rotor-stator mills. Pigments whose preparation means that they have a fairly high level of aggregation, such as finely divided organic pigments, carbon black and specific finely divided inorganic oxide pigments, for example, may further necessitate wet grinding techniques with very high specific energy input. This is provided, for example, by stirred bore mills and bead mills, dispersion compounders, roll mills or high-pressure homogenisers. The resulting pigments or filler dispersions are subsequently, where appropriate, adjusted to a consistency in composition that is desired for the subsequent drying, using further water or aqueous-organic medium or, where appropriate, further abovementioned additives.

Subsequently, the aqueous dispersion is preferably converted by means of drying into the desired solids component a). Suitable drying techniques include, in particular, spray drying, preferably single-fluid spray drying by means of a high-pressure and/or swirl-chamber nozzle, or spray drying by means of atomizing discs, freeze drying and spray freeze drying with upstream or downstream granulation or dry workup, buildup granulation, for example by the plate or drum granulation process, optionally with partially predried product, fluidized-bed drying and granulation, mixer agglomeration and mixer drying, optionally in combination with fluidized-bed or fluid-bed drying. Further suitable techniques include those such as mix-agglomeration in suspension with optional downstream fluidized-bed or fluid-bed drying, granulation by means of paste forming with downstream afterdrying and comminution or pelletizing, and also steam jet agglomeration. Combinations of the techniques mentioned are likewise possible. Particularly preferred drying techniques used are spray drying or fluidized-bed drying and fluidized-bed granulation.

By virtue of the system of the invention it is possible for the first time to achieve all desired coloristic and applications properties of aqueous pigmented paint and coating materials exclusively starting from pigments and fillers which are very effectively redispersible in aqueous systems, in the form of their solids component a). Paint and coating materials prepared in accordance with the system possess the advantages specified at the outset in relation to conventional liquid preparations. Particularly noteworthy features include the largely unlimited flexibility of application and also the environmental advantages afforded by the absence of liquid preparations in commerce until directly before application.

The paint and coating material system of the invention is especially suitable for preparing aqueous paints and coating compositions, especially emulsion paints and lacquer paints, metal paints and metal primers, automotive paints, wood preservative paints and stains, and also for preparing aqueous coloured paper coating slips and wallpaper paints, aqueous leather dressing colours, and aqueous printing inks for paper, for nonwovens and textiles.

EXAMPLES

Comparative Example 1

Industrial Standard Commercial Highly Filled White Interior Wall Paint

In accordance with the method published in "Farbe & Lack 104 ,7/98" and similar recipe, 200 g of the highly filled interior wall paint were prepared on a laboratory dissolver with a disc diameter of 50 mm in a 500 ml beaker having a diameter of 70 mm, the following ingredients having been introduced with stirring (amounts in % by weight):

| | |
|---|---|
| water | 27.0% |
| Calgon ® N (10% in water) | 0.2% |
| Borchigel ® L76 | 0.2% |
| (PU thickener from Borchers GmbH, Monheim, DE) | |
| Nopco ® 8034 E | 0.1% |
| (defoamer from Occidental Electrochemicals Corp., Irving, USA) | |
| Walocel ® XM 30000 PV | 0.4% |
| (cellulose ether from Wolff Walsrode AG, Walsrode, DE) | |
| NaOH (25%) | 0.1% |
| Borchigen ® NA40 | |
| (wetting agent from Borchers GmbH, Monheim, DE) | |
| Dowanol ® DPnB | 0.5% |
| (cosolvent from Dow Chemical Company, Delaware, USA) | |
| Preventol ® D 7 | 0.2% |
| (biocide from Bayer AG, Leverkusen, DE) | |
| Bayertitan ® RKB 2 | 5.7% |
| (titanium dioxide pigment from Bayer AG, Leverkusen, DE) | |
| Socal ® P2 | 8.0% |
| (finely divided calcium carbonate from Solvay Alkali GmbH, Rheinberg, DE) | |

-continued

| | |
|---|---|
| Finntalk® M30 | 9.1% |
| (talc from Plüss-Staufer AG, Oftringen, CH) | |
| Omyalite® 90 | 12.5% |
| (chalk from Omya GmbH, Cologne, DE) | |
| Omyalite® 5 GU | 29.7% |
| (calcium carbonate from Omya, Cologne, DE) | |

The mixture was subsequently dispersed for 14 minutes at a rotary speed of 3500 min$^{-1}$ (peripheral speed approximately 9 m/s) using a dissolver, a power consumption of 70 W being measured on the machine.

The specific energy input relative to the volume of 125 cm$^3$ (density approximately 1.6 g/cm$^3$) is calculated from this to be 470 J/cm$^3$.

Subsequently, with stirring,

Dispersion® KDA 524n 50% about 6.0% (styrene acrylate dispersion from Freihoff)

was added and the mixture was dispersed for a further 2 minutes at a speed of 500 min$^{-1}$ (peripheral speed approximately 1 m/s) using a dissolver, a power consumption of 31 W being measured on the machine.

The specific energy input relative to the volume of approximately 136 cm$^3$ (density approximately 1.6 g/cm$^3$) is calculated from this to be 27 J/cm$^3$. To prepare the white paste, therefore, a specific energy input of 497 J/cm$^3$ in total was needed.

The paint material obtained possessed a particle size of less than 40 µm.

The resulting paste was aged for 12 hours before further testing.

Comparative Example 2
Industrial Standard Commercial Aqueous Violet Tinting Colour In accordance with the process described in Example 1 of the published patent application EP-A 735 109, 500 g of an aqueous pigment preparation based on the organic colour pigment C. I. Pigment Violet 23 were prepared, having the following composition (% by weight)

| | |
|---|---|
| C.I. Pigment Violet 23 | 25% |
| (Sandorinviolett® BL, Clariant) | |
| oxalkylation product | 15% |
| of comp. b) from DE-A-195 11 624, Ex. 1 | |
| Polyethylene glycol P 400 | 12% |
| Proxel® GXL 20% | 0.2% |
| water | 47.8% |

The specific energy input for the preparation with an average particle size of <0.5 µm was calculated as more than 4000 J/cm$^3$ (see also Schwedes, Feinmahl- und Klassiertechnik, Reprints, GVC December conference 1993, Cologne, published by GVC-VDI Gesellschaft für Verfahrenstechnik und Chemieingenieurwesen). Owing to the high level of fineness, it was not possible to measure a particle size for the product.

Example 1
Solid of Comp. a) for the Preparation of a Highly Filled White Interior Wall Paint According to the System of the Invention Using the process indicated in Comparative Example 1, but without addition of the cosolvent and of the styrene acrylate dispersion, a white dispersion was prepared in an amount of 2 kg and then using a laboratory spray drier (two-fluid drier) with an entry temperature of 170° C. and an exit temperature of 70° C. wasdried to give a low-dust powder having a residual moisture content of 0.39% by weight.

The composition of the solid (approximate weight %) was as follows:

| | |
|---|---|
| residual moisture content | 0.39% |
| Calgon® N | 0.03% |
| Borchigel® L76 | 0.3% |
| Nopco® 8034 E | 0.14% |
| Walocel® XM 30000 PV | 0.45% |
| sodium hydroxide | 0.1% |
| Borchigen® NA40 | 0.75% |
| Preventol® D 7 | 0.3% |
| Bayertitan® RKB 2 | 8.6% |
| Socal® P2 | 12.1% |
| Finntalk® M30 | 13.6% |
| Omyalite® 90 | 18.7% |
| Omyalite® 5 GU | 44.6% |

Example 2
Preparation of a Highly Filled White Interior Wall Paint According to the System of the Invention 200 g of the white interior wall paint were prepared on a laboratory dissolver with a disc diameter of 50 mm in a 500 ml beaker having a diameter of 70 mm, the following ingredients being introduced with stirring (amounts in % by weight):

| | |
|---|---|
| water | 27.0% |
| Dowanol® DPnB | 0.5% |
| Dispersion® KDA 524n 50% | 6.0% |
| (comp. b) of the system of the invention, see Comparative Example 1) | |
| solid from Example 1 | 66.5% |
| (comp. a) of the system of the invention) | |

The mixture was subsequently dispersed for 5 minutes at a speed of 500 min$^{-1}$ (peripheral speed approximately 1 m/s) using a dissolver, a power consumption of 30 W being measured on the machine.

The specific energy input relative to the volume of 125 cm$^3$ (density approximately 1.6 g/cm$^3$) is calculated from this to be 72 J/cm$^3$.

The paste thus produced showed no differences in viscosity relative to Comparative Example 1 and was suitable for use immediately following its preparation. The particle size was less than 40 µm. Coloristic testing was carried out in comparison with Comparative Example 1 by means of a drawdown onto knife-coating card using a 100 µm doctor. In both cases, the drawdowns were flawless and speck-free and of equal hiding power and whiteness. Nor were there any differences in the levelling and running properties.

A further coloristic test was carried out by stirring 3 parts of the violet colour paste from Comparative Example 2 by hand into 97 parts of the white paint according to the system of the invention, using a rubber wiper, and then subjecting this system to colorimetric comparison against the white paint of Comparative Example 1, tinted likewise, using the Cielab system. The colour strength found was 99.5%, the total colour difference dE 0.2.

Example 3
Preparation of a Violet-Tinted Aqueous Interior Wall Paint According to the System of the Invention In accordance with the process described in Example 1 of DE-A-195 11 624, 1200 g of an aqueous pigment preparation based on the organic colour pigments C. I. Pigment Violet 23 were prepared, having the following composition (% by weight):

| | |
|---|---|
| C.I. Pigment Violet 23 (Sandorinviolett ® BL, Clariant) | 27% |
| dispersant based on oxalkylated castor oil | 13% |
| thickener, 10% (Mowiol ® 488, Hoechst AG, DE) | 43% |
| water | 17% |

The specific energy input for the preparation with an average particle size of <0.5 µm was calculated as being more than 4000 J/cm³.

The resulting slurry (dispersion) was subsequently dried using a laboratory spray drier (two-fluid drier) having an entry temperature of 170° C. and an exit temperature of 70° C. to give a low-dust powder having a residual moisture content of 1.5% by weight.

The composition of the violet solid (approximate weight %) was as follows:

| | |
|---|---|
| C.I. Pigment Violet 23 | 60% |
| dispersant | 28.9% |
| thickener | 9.6% |
| residual moisture | 1.5% |

200 g of the violet-tinted interior wall paint were prepared on a laboratory dissolver having a disc diameter of 50 mm in a 500 ml beaker having a diameter of 70 mm, the following ingredients being introduced with stirring (amounts in % by weight):

| | |
|---|---|
| water | 25.0% |
| Dowanol ® DPnB | 0.5% |
| Dispersion ® KDA 524n 50% (comp. b) of the system of the invention, see Comparative Example 1) | 6.0% |
| solid (from Example 1 (comp. a) of the system of the invention) | 68.3% |
| violet solid (comp. a) of the system of the invention | 0.2% |

The mixture was subsequently dispersed for 5 minutes at a speed of 500 min⁻¹ (peripheral speed approximately 1 m/s) using a dissolver, a power consumption of 31 W being measured on the machine.

The specific energy input relative to the volume of approximately 125 cm³ (density approximately 1.6 g/cm³) is calculated from this to be 74 j/cm³.

When applied using a doctor, the paste thus prepared gave a streak-free and speck-free drawdown whose colour strength underwent no substantial increase even after stirring for a further 2 minutes on a high-speed stirrer. The particle size was less than 40 µm.

In comparison to the white paint according to Example 2, the violet-tinted paint showed only a slightly increased viscosity, but had comparable levelling, running and drying properties.

No disadvantages in the scrub resistance and wipe resistance properties were observed.

Equally good results were also obtained after both solids of comp. a) of this example had been subjected to homogeneous dry mixing before being introduced into the system.

Example 4

Preparation of a Red-Tinted Aqueous Interior Wall Paint According to the System of the Invention 1200 g of a yellow dispersion of the following composition (% by weight) were prepared on a laboratory dissolver:

| | |
|---|---|
| Bayferrox ® Red 130 M (inorganic pigment C.I. Pigment Red 101, Bayer AG) | 57% |
| dispersant based on oxalkylated castor oil | 4.4% |
| dispersant based on modified phosphate ester | 14.7% |
| thickener, 10% (Mowiol 4-88, Hoechst AG) in water | 23.2% |

Dispersion was carried out with a disc of 50 mm in diameter and at a speed of 3500 min⁻¹ for a period of 20 minutes. The specific energy input was calculated as 136 j/cm³.

The resulting slurry (dispersion) was subsequently dried using a laboratory spray drier (two-fluid drier) having an entry temperature of 170° C. and an exit temperature of 70° C. to give a low-dust powder having a residual moisture content of 0.3% by weight.

The composition of the red solid (approximate weight %) was as follows:

| | |
|---|---|
| C.I. Pigment Red 101 | 87.8% |
| total dispersant | 7.85% |
| thickener | 4.05% |
| residual moisture | 0.3% |

200 g of the red-tinted interior wall paint were prepared on a laboratory dissolver having a disc diameter of 50 mm in a 500 ml beaker having a diameter of 70 mm, the following ingredients being introduced with stirring (amounts in % by weight):

| | |
|---|---|
| water | 25.5% |
| Dowanol ® DPnB | 0.5% |
| Dispersion ® KDA 524n 50% (comp. b) of the system of the invention, see Comparative Example 1) | 6.0% |
| solid from Example 1 (comp. a) of the system of the invention) | 63.0% |
| red solid from above (comp. a) of the system of the in invention | 5.0% |

The mixture was subsequently dispersed for 5 minutes at a speed of 500 min⁻¹ (peripheral speed approximately 1 m/s) using a dissolver, a power consumption of 28 W being measured on the machine.

The specific energy input relative to the volume of approximately 125 cm³ (density approximately 1.6 g/cm³) is calculated from this to be 67 J/cm³.

When applied using a doctor, the paste thus prepared gave a very strongly coloured and streak-free and speck-free drawdown whose colour strength underwent no substantial increase even after stirring for a further 2 minutes on a high-speed stirrer. The particle size was less than 40 µm.

In comparison to the white paint according to Example 2, the red-tinted paint showed only a slightly increased viscosity, but no fundamental disadvantageous applications properties.

Equally good results were also obtained after both solids of comp. a) of this example had been subjected to homogeneous dry mixing before being introduced into the system.

What is claimed is:

1. A paint and coating material system comprising
   a) at least one solid component comprising at least one organic or inorganic white, black or chromatic pigment, organic or inorganic fillers, or mixtures thereof and
   b) at least one binder component,
   wherein the components of the system produce an aqueous dispersion having a particle size of <60 μm (determined in accordance with ISO 1524; 1983) in water, with a specific energy input of less than 150 J/cm$^3$, based on the sum of the volumes of the components and water, and wherein the solid component a) is used in granular form having an average particle size of 20–5000 μm, determined from the mass distribution.

2. The paint and coating material system of claim 1 wherein the average particle size is 50–2000 μm.

3. The paint end coating material system of claim 1 wherein the average particle size is 100–500 μm.

4. The paint and coating material system of claim 1, comprising
   from 1 to 95% by weight of the solid component a)
   from 0.1 to 60% by weight of the binder component b) in solid or liquid form and
   from 4.9 to 98.9% by weight of water, based in each case on the paint and coating material system.

5. The paint and coating material system of claim 1 further comprising a component c), which is a water-soluble or water-miscible organic solvent.

6. The paint and coating material system of claim 1 wherein the solid component a) is obtained by wet comminution of the pigments and/or fillers in their solid form or as an aqueous or aqueous-organic suspension, optionally in the presence of an additive, and then drying them.

7. The paint and coating material system of claim 1 wherein the solid component a) is obtained by spray drying.

8. The paint and coating material system of claim 7 wherein the spray drying is performed in single-fluid or two-fluid spray dryers.

9. The paint and coating material system according to claim 1 wherein the solid component a) is obtained by freeze drying.

10. A process for painting and coating materials comprising applying an effective amount of the paint and coating material system of claim 1 on metal, wood, paper, coating slips, wallpaper, leather, nonwovens and textiles to provide a decorative or protective coating thereon.

* * * * *